(12) United States Patent
Shevlin et al.

(10) Patent No.: US 8,783,878 B2
(45) Date of Patent: Jul. 22, 2014

(54) OPTICAL SYSTEM AND METHOD

(75) Inventors: Fergal Patrick Shevlin, Dublin (IE);
Omar Sqalli, Berlin (DE); Nicolas Descharmes, Renens (CH)

(73) Assignee: Optyka Limited, Dublin (IE)

( * ) Notice: Subject to any disclaimer, the term of this patent is extended or adjusted under 35 U.S.C. 154(b) by 668 days.

(21) Appl. No.: 12/808,735

(22) PCT Filed: Dec. 18, 2008

(86) PCT No.: PCT/EP2008/010867
§ 371 (c)(1),
(2), (4) Date: Jan. 11, 2011

(87) PCT Pub. No.: WO2009/077198
PCT Pub. Date: Jun. 25, 2009

(65) Prior Publication Data
US 2011/0102748 A1 May 5, 2011

(30) Foreign Application Priority Data

Dec. 19, 2007 (IE) .................................... 2007/0939
Apr. 29, 2008 (IE) .................................... 2008/0335

(51) Int. Cl.
*G03B 21/28* (2006.01)
(52) U.S. Cl.
USPC .................. 353/98; 353/30; 353/34; 353/38; 353/85; 353/94; 372/9; 372/99; 359/223.1; 359/298

(58) Field of Classification Search
USPC ........... 353/30, 31, 34, 38, 70, 84, 85, 94, 98, 353/99, 122; 359/10, 24, 33, 223.1, 298, 359/634, 707; 372/21, 99, 9, 12–16, 101, 372/108; 349/5, 7–9
See application file for complete search history.

(56) References Cited

U.S. PATENT DOCUMENTS 4,155,630 A    5/1979   Ih
5,479,238 A *  12/1995  Whitney ......................... 355/53
(Continued)

FOREIGN PATENT DOCUMENTS

EP      0589179 A1    3/1994
EP      1505425 A1    2/2005
(Continued)

OTHER PUBLICATIONS

International Preliminary Report on Patentability from international application No. PCT/EP2008/010867, dated Jun. 22, 2010, 8 pp.
(Continued)

*Primary Examiner* — Sultan Chowdhury
(74) *Attorney, Agent, or Firm* — Shumaker & Sieffert, P.A.

(57) ABSTRACT

An optical system (100) comprises a coherent light source (101) and optical elements for directing light from the source to a target (1001). The optical elements include at least one diffusing element (141, 161) arranged to reduce a coherence volume of light from the source and a variable optical property element (151). A control system (1021) controls the variable optical property element such that different speckle patterns are formed over time at the target (1001) with a temporal frequency greater than a temporal resolution of an illumination sensor or an eye (1011) of an observer so that speckle contrast ratio in the observed illumination is reduced. The variable optical property element (151) may be a deformable mirror with a vibrating thin plate or film.

22 Claims, 5 Drawing Sheets

(56) References Cited

U.S. PATENT DOCUMENTS

| | | | |
|---|---|---|---|
| 5,684,566 A | 11/1997 | Stanton | |
| 6,317,169 B1* | 11/2001 | Smith | 348/744 |
| 6,594,090 B2* | 7/2003 | Kruschwitz et al. | 359/707 |
| 6,807,010 B2* | 10/2004 | Kowarz | 359/634 |
| 7,046,446 B1* | 5/2006 | Kowarz et al. | 359/618 |
| 7,144,117 B2* | 12/2006 | Kojima | 353/37 |
| 7,838,816 B2* | 11/2010 | Babayoff et al. | 250/234 |
| 7,866,831 B2* | 1/2011 | Kasazumi et al. | 353/98 |
| 2003/0035460 A1* | 2/2003 | Tsikos et al. | 372/101 |
| 2003/0039036 A1 | 2/2003 | Kruschwitz et al. | |
| 2004/0239889 A1 | 12/2004 | Inamoto | |
| 2007/0035826 A1 | 2/2007 | Yokoyama et al. | |
| 2007/0047059 A1 | 3/2007 | Howard et al. | |
| 2008/0079904 A1* | 4/2008 | Bartlett | 353/31 |
| 2008/0123168 A1* | 5/2008 | Maeda et al. | 359/223 |
| 2008/0170285 A1* | 7/2008 | Kasazumi et al. | 359/223 |
| 2008/0198334 A1 | 8/2008 | Kasazumi et al. | |

FOREIGN PATENT DOCUMENTS

| | | |
|---|---|---|
| EP | 1677144 A1 | 7/2006 |
| JP | 2003262920 A | 9/2003 |
| WO | 2007072335 A2 | 6/2007 |
| WO | 2007104016 A2 | 9/2007 |

OTHER PUBLICATIONS

International Search Report from international application No. PCT/EP2008/010867, dated Aug. 5, 2009, 5 pp.

Office Action dated Feb. 22, 2012 for corresponding Chinese Application No. 200880122317.5 (3 pgs.).

Office Action dated Mar. 26, 2013 for corresponding Japanese Patent Application No. 2010-538470 (6 pp.)

* cited by examiner

OPTICAL SYSTEM AND METHOD

The present invention relates to the field of illumination systems using spatially and/or temporally coherent light sources. More particularly, the present invention relates to the reduction of speckle and/or other interference patterns observed in images displayed, areas illuminated, and images acquired using coherent light sources, most particularly, using a deformable mirror to reduce speckle.

Speckle and/or other interference patterns arise through constructive and destructive interference when spatially and/or temporally coherent light is scattered by transmission through, or reflection from, a rough surface. In this context, we consider the term speckle as synonymous with interference patterns. We understand the term "coherent" to mean spatially and/or temporally coherent. We use the term "coherence volume" to mean a correlated region within a beam of light where speckle can arise.

Speckle is manifest as bright and dark granular and/or more structured artefacts unrelated to image content that can degrade image quality. Speckle is of particular concern in image display systems such as projectors, rear-projection televisions, near-to-eye displays, head-mounted displays, and head-up displays. Speckle is also of concern in image acquisition systems such as Raman, confocal, and fluorescence microscopes.

A known approach to reducing speckle is to superimpose N uncorrelated speckle patterns to achieve up to a sqrt(N) reduction in speckle contrast ratio (the standard deviation of intensity divided by the mean intensity). A speckle pattern uncorrelated to another can be formed when rays in the illumination beam follow different optical paths during transmission through, or reflection from, an optical element with appropriate reflective, refractive, or diffractive characteristics. A common optical element used is a diffuser that diversifies ray angles within the illumination beam. A sequence of uncorrelated speckle patterns can be formed over time by moving the optical element or varying its characteristics appropriately. If the frequency of motion or variation is greater than an observer's temporal resolution of visual perception, or a sensor's temporal resolution of image acquisition, then the uncorrelated speckle patterns are superimposed.

US 2007/0223091 discloses a refracting element rotated through an illumination beam to diversify ray angles. US 2007/0251916 discloses a diffusing element in an illumination beam which is mechanically vibrated to diversify ray angles. U.S. Pat. No. 4,155,630 discloses a mirror having a tip/tilt motion for scanning an illumination beam across a diffuser to diversify ray angles.

Problems associated with solutions that depend on rotation, translation, and/or vibration of an optical element include size, scale, weight, cost, and power consumption. A problem associated with many approaches is their failure to achieve the maximum sqrt(N) reduction in speckle contrast ratio due to some correlation remaining between the N speckle patterns. Another problem is that if there is a temporal and/or other constraint which limits the number, N, of images that can be superimposed, the maximum sqrt(N) reduction in speckle contrast ratio may be insufficient to achieve the desired image or illumination quality.

WO 2007/049263 discloses an image projection display system comprising an element, such as a deformable mirror, with a variable optical property, in which the element with a variable optical property is used to correct or introduce aberration or distortion to provide improved projected image quality or enhanced image perception by an observer. The mirror is actuated by one or more electrostatic actuators for the purpose of deforming the mirror in a controlled way so as to change its shape and therefore the wavefront of a reflected beam. In a simple case of a focus correction optic, for example, the actuator is used to pull the mirror to a predetermined shape so that the beam's wavefront is modified to place the focus at a different location. For an "adaptive optics" correction operation, multiple simultaneous spatially distributed electrostatic actuations are required to correct the wavefront of the beam by changing the shape of the mirror correspondingly.

CA 2,177,200 discloses an illumination system and method employing a deformable mirror and diffractive optical elements for photolithography in which the deformable mirror is arranged to shape the wavefront of a laser beam to obtain uniform illumination and movement of the diffractive or diffusive optical element is arranged to reduce speckle.

STATEMENTS OF INVENTION

According to a first aspect of the invention, there is provided an optical system comprising: a coherent light source; optical elements for directing light from the source to a target, said optical elements including at least one diffusing element arranged to reduce a coherence volume of light from the source and a variable optical property element; and a control system arranged to control the variable optical property element to form different speckle patterns over time at the target with a temporal frequency greater than a temporal resolution of an illumination sensor or an eye of an observer to reduce speckle contrast ratio in the observed illumination.

Conveniently, the variable optical property element is located between two diffusing elements.

Advantageously, the variable optical property element comprises a deformable mirror system.

Conveniently, the deformable mirror system is modulated pneumatically or by an air flow.

Alternatively, the deformable mirror is modulated by electrostatic, piezoelectric, electromagnetic, acoustic, hydraulic, and/or mechanical actuation.

Conveniently, the coherent light source means comprises a plurality of coherent and non-coherent light sources.

Conveniently, the target is an image forming device.

Advantageously, a projection optical system magnifies and relays an image from the image forming device to another position.

Advantageously the optical system comprises a light beam homogeniser.

Conveniently, the light beam homogeniser is a fly's eye lens, a tunnel integrator or a diffuser.

According to a second aspect of the invention, there is provided a deformable mirror system comprising: a thin plate or film coated to reflect predetermined wavelengths of light; actuator means arranged to impart motion to the thin plate or film such that its surface shape is continuously deformed elastically; and a control system arranged to control the actuator to cause a sequence of motions and surface shape deformations of the thin plate or film to change a speckle pattern formed from coherent light reflected from the thin plate or film at a target over a period of time less than a temporal resolution of an illumination sensor to reduce speckle contrast ratio in the observed illumination.

Conveniently, the control system effects surface shape deformations at a resonant frequency of the system.

Optionally, the control system effects surface shape deformations at a fixed frequency.

Optionally, the control system effects surface shape deformations at a variety of frequencies.

Conveniently, the deformable mirror system comprises sensing means to observe system behaviour.

Advantageously, the control system is arranged to use the observations of the sensing means to operate in closed-loop manner to maintain desired system behaviour.

Conveniently, the sensing means comprises a photosensitive element.

Conveniently, the sensing means comprises a plurality of sensors.

Conveniently, the actuator means comprises a piezoelectric actuator.

Optionally, the actuator means comprises a pneumatic actuator.

Optionally, the motion is imparted to the thin plate or film by a mounting frame moved by the actuator means.

Optionally, the motion is imparted to the thin plate or film by an air flow.

Conveniently, the actuator means comprises a plurality of actuators.

DETAILED DESCRIPTION OF THE INVENTION

The invention will be more clearly understood from the following description of some embodiments thereof, given by way of example only, with reference to the accompanying drawings, in which:—

Figure 5A:
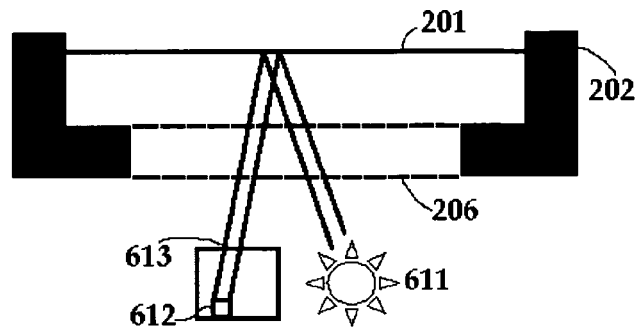
Figure 5B:
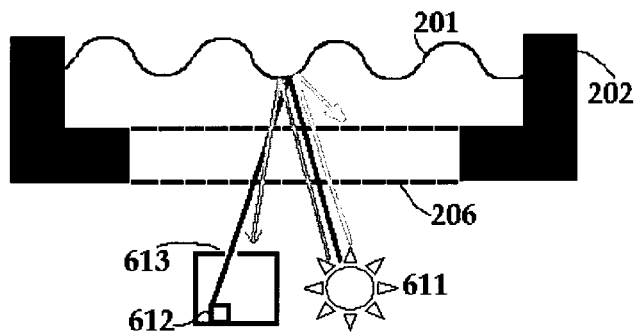
Figure 5C:
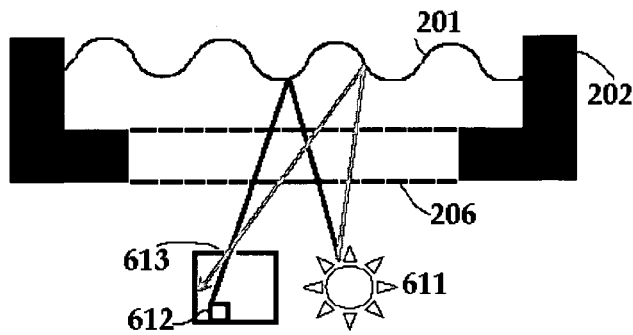
Figure 6:
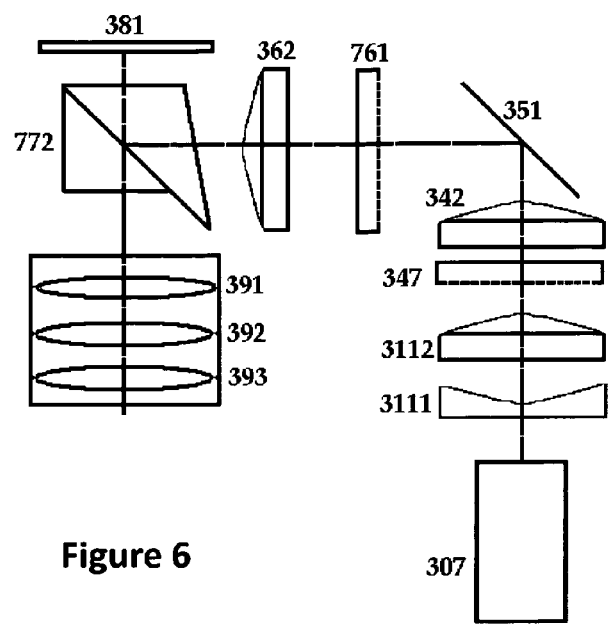
Figure 7:
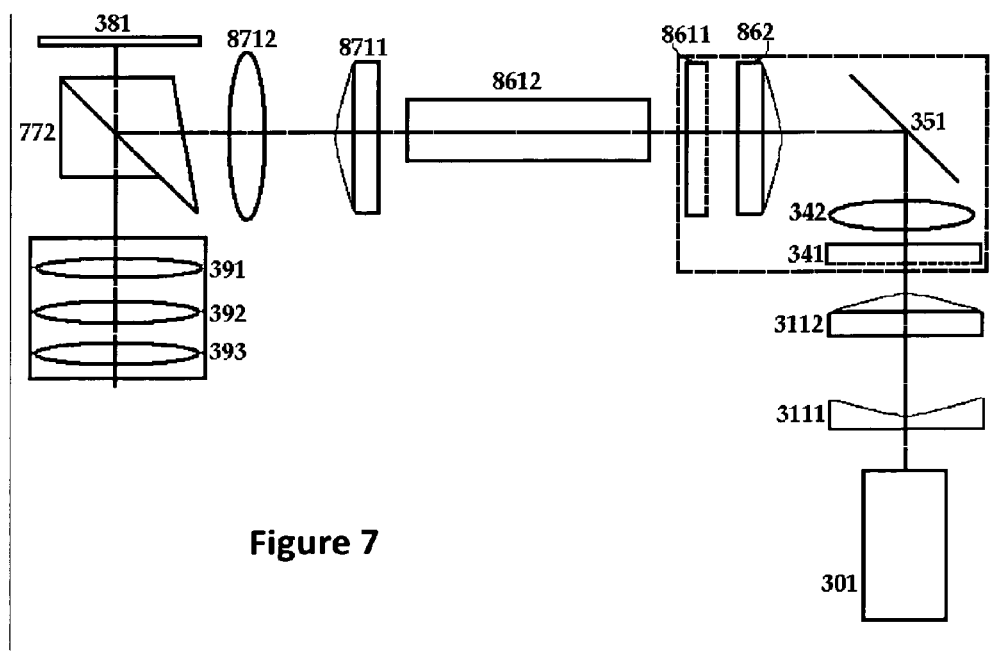

FIGS. 5A, 5B, and 5C illustrate various elements of a deformable mirror sensing system according to the invention;

FIG. 6 illustrates elements of a projection display system that uses a beam-shaping holographic optical element as a diffuser and for uniform light intensity distribution; and FIG. 7 illustrates elements of a projection display that uses a beam-shaping reflective tunnel as a diffuser and for uniform light intensity distribution.

This invention provides a system and method for reducing speckle observed in images displayed, images acquired, or areas illuminated with spatially and/or temporally coherent light sources.

The system comprises at least one variable optical property element such as a deformable mirror that is used to change optical paths of rays in the illumination beam with the effect of changing the speckle patterns formed over time. In addition, the system can comprise at least one constant optical property element, such as a diffuser or optical fibre, with the effect of reducing the sizes of coherence volumes in the illumination beam.

Figure 1:
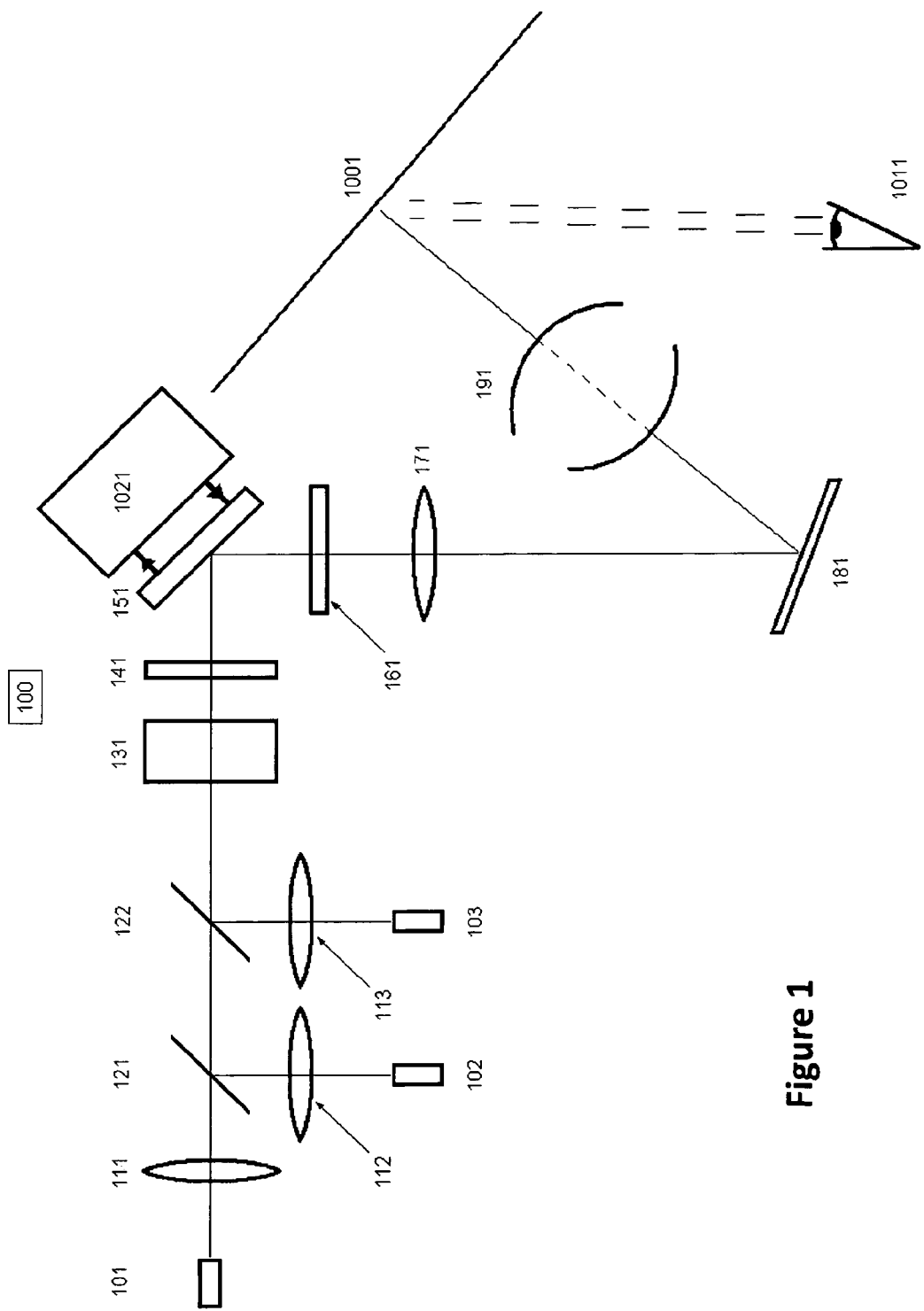
FIG. 1 illustrates a projection display system 100 in accordance with an embodiment of the present invention.

FIG. 1 illustrates a projection display system 100 in accordance with an embodiment of the present invention. A sequence of elements define an optical path between coherent light sources 101, 102, and 103 and a surface 1001 onto which an image is projected. Coherent light sources 101, 102, and 103 may be red, green, and blue semiconductor laser diodes, such as Arasor Ltd./Novalux Inc. NECSEL laser diodes, or Philips-Lumileds Inc. Luxeon LEDs (light-emitting diodes,) or a combination of semiconductor laser diodes and/or light-emitting diodes with Philips Electronics N.V. UHP (ultra-high pressure) arc lamps. The coherent light sources 101, 102, and 103 may be free beam sources or fibre-coupled sources. A multi-mode fibre or a bundle of fibres (not shown) may be used in the optical path to reduce the sizes of coherence volumes.

A source image forming device 181 can be illuminated sequentially to form colour fields of the image by turning on and off or selectively filtering any combination of light sources 101, 102, and 103. The source image forming device 181 is a pixellated microdisplay such as a Texas Instruments Inc. DMD (digital micromirror device) display panel, Sony Corp. SXRD LCOS (liquid crystal on silicon) display panel, or Epson Inc. HTPS (high-temperature polysilicon) LCD (liquid crystal display) panel.

Optical systems 111, 112, and 113 collect light from the light sources 101, 102, and 103 and direct the light towards an integrating optical system or homogeniser 131. The light beam homogeniser may be a fly's eye lens, a tunnel integrator or a diffuser. Light beams from light sources 102, 103 are aligned with appropriate dichroic reflectors 121 and 122, such as those from Oerlikon Balzers Ltd. The integrating optical system 131 facilitates more even distribution of light intensity across the illumination beam. The integrating optical system 131 may incorporate an integrating reflective tunnel such as LightTunnel from Oerlikon Balzers Ltd. or fly's eye lens arrays.

Optical systems 141 and 161 comprise constant optical property elements that act as first and second diffusers to diversify ray angles within the illumination beam. They may comprise single diffusing elements or a stack of multiple diffusing elements. Optical systems 141 and/or 161 may be light-shaping holographic diffusers or diffractive optical elements from Edmunds Optics Inc. The nominal maximum angle of diffusion is such that as little light as possible is lost from the illumination system. Alternative forms of constant optical property elements are fly's eye lenses and tunnel integrators, so that an optical element 141 or 161 may be, for example, a fly's eye lens or light tunnel.

The variable optical property element 151 is a deformable mirror, under the control of control system 1021, located between the diffusers 141 and 161.

An optical system 171 directs the illumination beam from the second diffuser 161 onto a source image forming device 181. A projection optical system 191 magnifies the source image from the microdisplay and forms a real image at a screen or other surface 1001. The real image is perceived by an eye 1011 of an observer.

The effects of the diffusers 141 and 161 are such that the coherence volumes within the illumination beam are reduced in size such that they are small with respect to the spatial resolution of the eye 1011 of the observer. The effect of the variable optical property element 151 changing the optical paths of rays is such that different spatial extents of coherence volumes are achieved, and that different speckle patterns within the coherence volumes can arise.

The deformable mirror differs from known applications in that the actuation essentially "randomises" the phase difference between wavelets reflected from the mirror rather than "correcting" their wavefronts based on any feedback of a given input beam. This is generally achieved by one actuator which vibrates the thin plate or film (rather than changes its shape by electrostatic actuation). Although additional actuators may be used to improve the "randomisation", they all work in the same way which is to vibrate or disturb the thin plate or film such that multiple surface deformations are formed over time. It is this randomness of wavelet reflectivity in direction and time that provides speckle reduction. In essence the thin plate or film is vibrating in a "drum-like"

manner rather than being controlled in shape at much lower frequencies. When the system operates to change speckle patterns arising over a period of time less than the temporal resolution of the eye 1011 of the observer, a sequence of speckle patterns are superimposed and so the speckle contrast ratio is reduced.

The amount of speckle observed is a function of the integration time of an observer or camera or other sensor. For human visual perception this is slow, e.g. <100 Hz, and in this instance high speed deformation of the deformable mirror is not essential. However, the deformations across the surface of the mirror are such that an improvement in speckle reduction is still achieved when compared to, for example, use of a rigid mirror.

In the high speed case, this indeed is a major advantage for speckle reduction in systems which use a camera or other sensor with a relatively short exposure period (integration time). Potentially the mirror can be modulated by a piezoelectric element to multiple 100s of kHz, so that in a high speed inspection system, for example, faster image acquisition with lower speckle noise is enabled.

A structural feature which allows the high speed response is the elastic deformation response to a mechanical stimulus such as that from a piezoelectric or pneumatic element or a turbulent air flow actuator such as a rotating fan. Thus, the deformable mirror thin plate or film may be deformed elastically at high frequency by piezoelectric or pneumatic actuation or by a flow of air over the thin plate or film.

Such high speed modulation is not necessary for image display applications. The central aspect of the deformable mirror that improves speckle reduction at lower frequencies as required for image display applications is an ability to control a sequence of deformations dynamically to avoid a periodically repetitive aspect of known techniques with the result that improved speckle contrast ratio is achievable. The spatial extent of coherence volumes and the speckle pattern that arises is a function of the mirror surface deformation and this can be controlled by drive frequency and amplitude. This has the advantage compared to other (e.g. rotating diffuser, rigid mirror) techniques of low mechanical movement, lack of rotating parts with limits such as motor spindle rotation times.

The combination of diffusers with the vibrating thin plate or film may reduce observable speckle in the projected image to its theoretical minimum.

Figure 2:
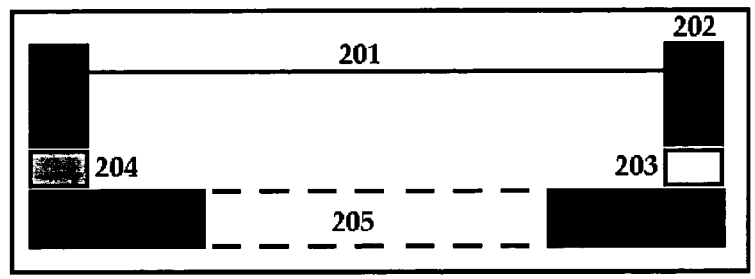
FIG. 2 illustrates various elements of a deformable mirror 200 of the system.

FIG. 2 illustrates various elements of a deformable mirror system 200 in accordance with an embodiment of the present invention. A DuPont Mylar polyester film 201 coated to reflect predetermined wavelengths of light is mounted under tension on a frame 202. Between frame 202 and mount 205 is a piezoelectric actuator 203 and one or more passive spacers 204. An electronic control system 1021 applies a sequence of voltages to piezoelectric actuator 203 such that the actuator moves the frame 202. Motion from the frame is imparted to the film 201 such that its surface is deformed elastically. An appropriate sequence of actuation voltages results in a variety of convex and concave shape deformations in film 201 over time. The deformable mirror system 200 dynamically diversifies reflected light ray angles, so changes the optical paths of rays, within the illumination beam.

In alternative embodiments the piezoelectric actuator 203 is mounted in one of a variety of locations such that it is in contact with the frame 202 or the mount 205 or with the film 201. In alternative embodiments there may be more than one piezoelectric actuator 203 in a variety of locations. In alternative embodiments the film or thin plate or film 201 is a nitrocellulose pellicle or other material which has sufficient elastic deformation and is coated to reflect relevant wavelengths of light.

ALTERNATIVE EMBODIMENTS

Figure 3:
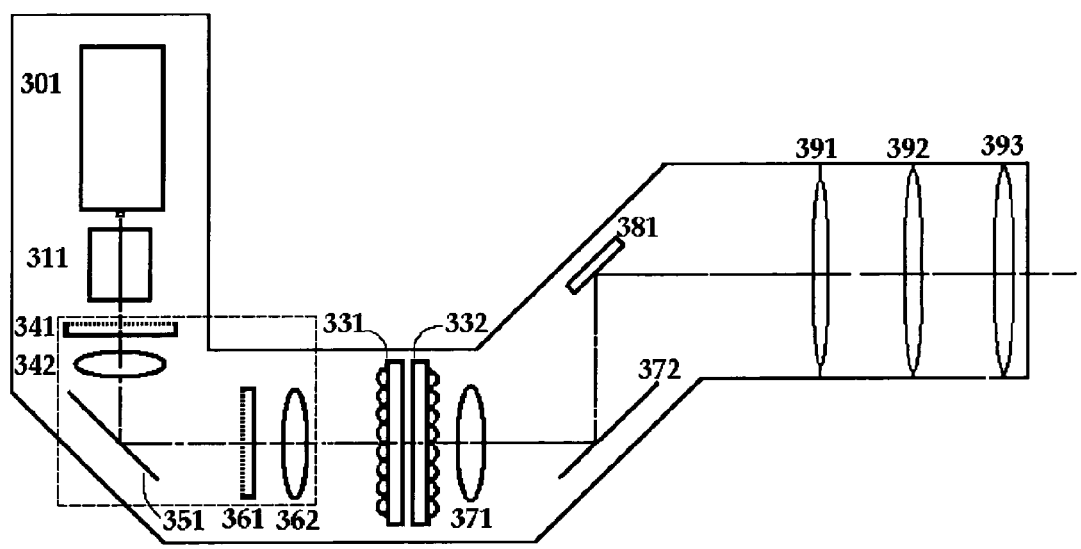
FIG. 3 illustrates elements of projection display system that uses a fly's eye illumination intensity homogenisation and beam shaping optical system.

FIG. 3 illustrates a projection display system in accordance with an alternative embodiment of the present invention. Coherent light source optical system 301 comprises semiconductor laser diodes with associated wavelength conversion and beam alignment optics such that visible red, green, and blue light is emitted. The coherent light sources may be free beam sources or fibre-coupled sources. A multi-mode fibre or a bundle of fibres may be used to reduce the sizes of coherence volumes. The diameter of the illumination beams from coherent light source optical system 301 is expanded by beam expansion optical system 311 to achieve a size appropriate to the illumination optical system. Beam expansion also helps to avoid damage to optical elements sensitive to heat. Constant optical property elements 341 and 361 are diffusers to diversify ray angles within the illumination beam. Lenses 342 and 362 redirect light from the diffusers towards the subsequent elements in the optical path. Diffusers 341 and 361 act to reduce coherence volumes within the illumination beam. Variable optical property element 351 is a deformable mirror that dynamically diversifies ray angles in the illumination beam such that they are incident on diffuser 361 at a variety of different positions over time.

Fly's eye lens arrays 331 and 332 comprise an integrating optical system that produces appropriately-shaped areas of illumination with uniform light intensity distribution. These are directed by field lens 371 such that they overlap onto the source image forming microdisplay 381, in this case a digital micro-mirror device (DMD). Mirror 372 is oriented such that the illumination angle of incidence is appropriate to DMD pixel deflection angles. Coherent light source optical system 301 can be triggered in synchronisation with the image forming microdisplay 381 such that only the wavelength emitted is appropriate to a colour field whose pixel intensities are being modulated. Using the field-sequential colour technique, a colour image is formed over time. Lenses 391, 392, and 393 comprise a projection optical system that magnifies and relays the source image from the microdisplay 381 to another position.

Figure 4:
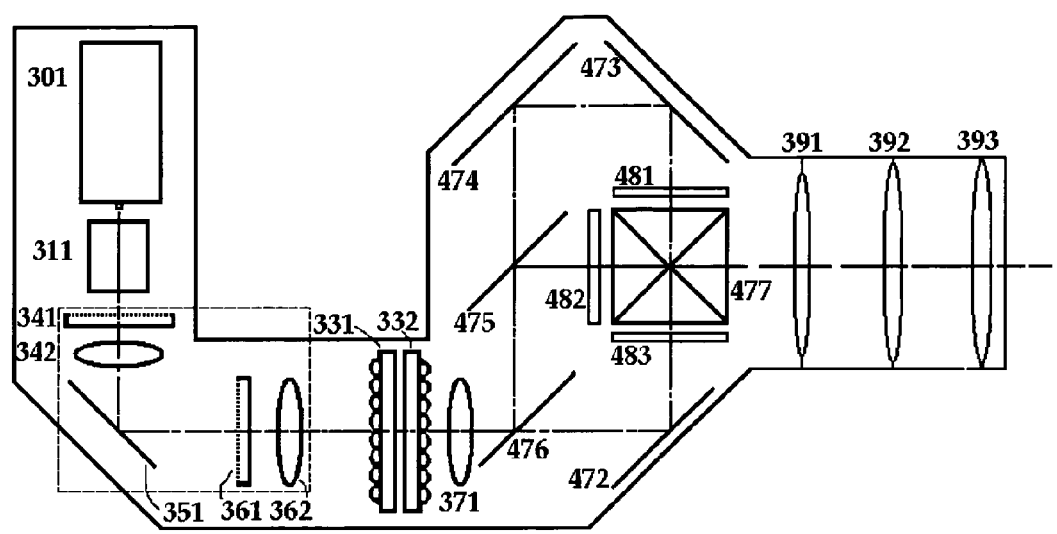
FIG. 4 illustrates elements of a projection display system that uses a fly's eye optical system and three source image colour field forming microdisplays.

FIG. 4 illustrates a projection display system in accordance with an alternative embodiment of the present invention. Coherent light source optical system 301 emits visible red, green, and blue light simultaneously and continuously (or in a pulsed manner with a periodicity shorter than the integration time). The coherent light sources in optical system 301 may be free beam sources or fibre-coupled sources. A multi-mode fibre or a bundle of fibres may be used to reduce the sizes of coherence volumes. Dichroic filters 475 and 476 selectively direct light to three different image colour field forming high temperature polysilicon (HTPS) LCD microdisplays 481, 482, and 483. Mirrors 472, 473, and 474 are used for directing the light beam onto the microdisplays 481, 482, and 483. X-cube dichroic filter prism 477 from Oerlikon Balzers Ltd. directs colour field imagery from the three microdisplays 481, 482, and 483 to lenses 391, 392, and 393 which comprise a projection optical system that magnifies and relays the source image to another position.

In one embodiment an electronic control system 1021 applies a sequence of voltages to drive the deformable mirror system 200 mirror at a resonant frequency so as to increase the magnitude of shape deformations and decrease power consumption. In alternative embodiments a single actuation voltage frequency, a range of frequencies, or a sample of frequencies across a range are applied.

FIG. 6 illustrates a projection display system in accordance with an alternative embodiment of the present invention. Coherent light source optical system 307 comprises semiconductor laser diodes with associated wavelength conversion and beam alignment optics such that visible red, green, and blue light is emitted. The coherent light sources in optical system 307 may be free beam sources or fibre-coupled sources. A multi-mode fibre or a bundle of fibres in an optical path from the light source may be used to reduce the sizes of coherence volumes.

The diameter of the illumination beams from coherent light source optical system 301 is expanded by a beam expansion optical system comprising plano-concave negative lens 3111 and plano-convex positive lens 3112, to achieve a size appropriate to the illumination optical system. Beam expansion also helps to avoid damage to optical elements sensitive to heat. Constant optical property elements 347 and 761 act as diffusers to diversify ray angles within the illumination beam. Lenses 342 and 362 redirect light from the diffusers towards subsequent elements in the optical path. Diffusers 347 and 761 act to reduce coherence volumes within the illumination beam. Variable optical property element 351 is a deformable mirror that dynamically diversifies ray angles in the illumination beam such that they are incident on diffuser 761 at a variety of different positions over time.

Constant optical property diffuser element 761 is a Top Hat beam-shaping diffractive optical element from Edmunds Optics Inc. that comprises an integrating optical system. It spreads the illumination beam with specified divergence angles to control the intensity profile of the beam and its spatial distribution so that it efficiently and relatively evenly illuminates the rectangular source image or colour field-forming liquid crystal on silicon (LCOS) microdisplay 381. The use of a single Top Hat diffuser for beam-shaping, uniform light intensity distribution, and diffusion leads to a higher light transmission through the system than would be the case if multiple optical elements were used. Residual non-uniform light intensity distribution is removed by the action of the deformable mirror 351 in dynamically redistributing, and so smoothing, intensity across the microdisplay 381.

FIG. 5A illustrates various elements of a deformable mirror sensing system in accordance with an embodiment of the present invention. A light source 611 illuminates the rear of deformable mirror 201 through aperture 206 in frame 202. Light source 611 is an LED with a lens such that light is directed by the lens. In alternative embodiments the light source is a laser diode and the light source is free or fibre-coupled. Some rays of light are reflected from a region of interest on the deformable mirror 201 through a pinhole 613 onto a photosensitive element 612. Deformation of deformable mirror 201 surface shape affects an amount of light that is directed onto photosensitive element 612 over time.

FIG. 5B illustrates a case when the deformable mirror 201 is vibrating such that there are convex and concave surface shapes. This modulates the light intensity registered by the photosensitive element 612. The higher the amplitude of the surface shapes the greater the modulation depth of the light intensity. FIG. 5C illustrates a case where the pinhole 613 blocks a ray of the light from another position on deformable mirror 201.

The surface area of photosensitive element 612 is an optimized compromise between the light intensity that reaches photosensitive element 612 and the size of the pinhole 613 that determines the accuracy of the measurement needed. The photosensitive element 612 and pinhole 613 areas are larger than half the period of deformable mirror 201 surface shape deformations when it is vibrating to avoid the case when the region of interest corresponds to a stationary position.

In another embodiment there is no pinhole 613 and the light source 611 has a non-uniform intensity profile. Therefore, the areas that are close to the region of interest are illuminated to a lesser extent. In this case, the photosensitive element 612 principally measures light intensity variations induced by the vibrating deformable mirror 201 in the area of interest. The other areas direct a continuous amount of light towards the detector. This introduces a DC component to the output signal and therefore reduces the dynamic of the measurement. However, the photosensitive element is still able to measure the oscillations of the vibrating thin plate or film with a resolution that is high enough to track the resonant modes of vibration.

In alternative embodiments the deformable mirror sensing system 600 may use piezoelectric, acoustic, electromagnetic, capacitive, current or voltage sensors.

An electronic control system in accordance with an embodiment of the present invention implements closed-loop control of the deformable mirror system 200, using input observations from deformable mirror sensing system to maintain desired behaviour over time.

FIG. 7 illustrates a projection display system in accordance with an alternative embodiment of the present invention. Coherent light source optical system 301 comprises semiconductor laser diodes with associated wavelength conversion and beam alignment optics such that visible red, green, and blue light is emitted. The coherent light sources in optical system 301 may be free beam sources or fibre-coupled sources. A multi-mode fibre or a bundle of fibres may be used to reduce the sizes of coherence volumes.

The diameter of the illumination beams from coherent light source optical system 301 is expanded by a beam expansion optical system comprising plano-concave negative lens 3111 and plano-convex positive lens 3112, to achieve a size appropriate to the illumination optical system. Beam expansion also helps to avoid damage to optical elements sensitive to heat. Constant optical property elements 341, 8611, and 8612 act as diffusers to diversify ray angles within the illumination beam. Lenses 342 and 862 redirect light towards the subsequent elements in the optical path. Diffusers 341, 8611, and 8612 act to reduce coherence volumes within the illumination beam. Variable optical property element 351 is a deformable mirror that dynamically diversifies ray angles in the illumination beam such that they are incident on diffuser 8611 at a variety of different positions over time.

Constant optical property element 8612 is a beam-shaping reflective tunnel that comprises an integrating optical system. Element 8611 is used as a diffuser and to produce uniform, efficient illumination over a microdisplay 381. The optical element 862 directs light through diffuser 8611 into the entrance aperture of reflective tunnel 8612. Diffuser 8611 is positioned close to the entrance aperture of 8612 to minimise light loss.

Optical systems 8711 and 8712 direct the illumination beam onto the source image forming DMD microdisplay 381, through the TIR (total internal reflection) prism 772.

Beam-shaping reflective tunnel 8612 may be a LightTunnel from Oerlikon Blazers Ltd, or any waveguide that has a rectangular shaped aperture at the exit. It is long enough to decrease the coherence volume and increase the phase shift between the optical rays.

In another embodiment of the invention a fan is used to generate turbulent air pressure such that motion of the deformable mirror surface is effected.

If there are no constant diffusing optical elements, this can result in the sizes of the coherence volumes being large with respect to the spatial resolution of the eye. This can result in speckle patterns that are large with respect to the image observed by the eye. The variable optical property element is used to change the optical paths of rays which results in a changing sequence of different speckle patterns over time.

In another embodiment of the invention there is one constant diffusing optical element positioned before the variable optical property element, with no constant diffusing optical element position after the variable optical property element. This can result in the sizes of the coherence volumes being smaller with respect to the spatial resolution of the eye. This can result in speckle patterns that are smaller with respect to the image observed by the eye. The variable optical property element is used to change the optical paths of rays which results in a sequence of different speckle patterns over time. Because the coherence volumes are smaller, the variable optical property element can act to create a more uncorrelated sequence of speckle patterns to reduce the speckle contrast ratio.

In another embodiment of the invention there is one constant diffusing optical element positioned after the variable optical property element, with no constant optical property diffusing element positioned before the variable optical property element. This can result in the sizes of the coherence volumes being smaller with respect to the spatial resolution of the eye. This can result in speckle patterns that are smaller with respect to the image observed by the eye. The variable optical property element is used to change the optical paths of rays which results in a sequence of different speckle patterns over time. Because the diffusing optical element is positioned after the variable optical property element, the ray angle diversification effect is increased. This can create a more uncorrelated sequence of speckle patterns to reduce the speckle contrast ratio.

However, it will be understood that it is preferable to have one constant diffusing optical element positioned before the variable optical property element and one constant diffusing optical element positioned after the variable optical property element.

In another embodiment the integrating optical system may be positioned before, in-between, or after the constant optical property elements. Appropriate design of the integrating optical system allows it to diversify ray angles within the illumination beam sufficiently so that the size of coherence volumes is reduced. This is achieved with a sufficient number of appropriate microlenses in a fly's eye array. Hence the constant optical property elements could be considered as elements of the integrating optical system.

In other embodiments the diffusing optical elements can be made of ground glass or other rough surface, or opal or other non-homogeneous medium.

In another embodiment the controller operates to create a sequence of different surface shapes, or indices of refraction, or characteristics of diffraction on the variable optical property element.

In another embodiment there may be more than one variable optical property element positioned on the optical path between the sources of illumination and the microdisplay. In other embodiments the variable optical property element is a deformable mirror with electrostatic, electromagnetic, acoustic, hydraulic, and/or mechanical actuation. In other embodiments the variable optical property element is a liquid crystal lens, a liquid crystal phase modulator, or other lens with dynamically-controllable indices of refraction or characteristics of diffraction across its surface (electro-optic, acousto-optic, photo-optic, magneto-optic or other "solid-state" materials could be used). In other embodiments the variable optical property element is a fluid mirror or lens with dynamically controllable surface shapes.

It will be understood that the invention has applications in high speed inspection and microscopy.

The invention is not limited to the embodiments described but may be varied in construction and detail.

The invention claimed is:

1. An optical system comprising:
a coherent light source;
a target;
optical elements for directing light from the source to the target, said optical elements including at least one diffusing element arranged to reduce a coherence volume of light from the source and a deformable mirror system arranged to change optical paths of the light over time; and
a control system arranged to control the deformable mirror system to form different speckle patterns over time at the target with a temporal frequency greater than a predetermined temporal resolution of an illumination sensor or an eye of an observer to reduce speckle contrast ratio in the observed illumination.

2. An optical system as claimed in claim 1, wherein the deformable mirror system is located between two diffusing elements.

3. An optical system as claimed in claim 1, wherein the deformable mirror system is modulated pneumatically or by an air flow.

4. An optical system as claimed in claim 1, wherein the deformable mirror system is modulated by electrostatic, piezoelectric, electromagnetic, acoustic, hydraulic, and/or mechanical actuation.

5. An optical system as claimed in claim 1, wherein the coherent light source comprises a plurality of coherent and non-coherent light sources.

6. An optical system as claimed in claim 1, wherein the target is an image forming device.

7. An optical system as claimed in claim 6, wherein a projection optical system is arranged to magnify and relays an image from the image forming device to another position.

8. An optical system as claimed in claim 1, comprising a light beam homogeniser.

9. An optical system as claimed in claim 8, wherein the light beam homogeniser is a fly's eye lens, a tunnel integrator or a diffuser.

10. An optical system comprising:
a coherent light source;
a target;
optical elements for directing light from the source to the target, said optical elements including at least one diffusing element arranged to reduce a coherence volume of light from the source; and
a deformable mirror system arranged to change optical paths of the light over time, wherein the deformable mirror system comprises:
a deformable thin plate or film coated to reflect predetermined wavelengths of light;
actuator means arranged to impart motion to the thin plate or film such that its surface shape is continuously deformed elastically; and
a control system arranged to control the actuator to cause a sequence of motions and surface shape deformations of the thin plate or film to change a speckle pattern formed from coherent light from the coherent light source and reflected from the thin plate or film at the target over a period of time less than the predetermined temporal resolution of an illumination sensor to reduce speckle contrast ratio in the observed illumination.

11. A optical system as claimed in claim 10, wherein the control system effects surface shape deformations at a resonant frequency.

12. A optical system as claimed in claim 10, wherein the control system effects surface shape deformations at a fixed frequency.

13. An optical as claimed in claim 10, wherein the control system effects surface shape deformations at a variety of frequencies.

14. An optical system as claimed in claim 10, comprising sensing means to observe behavior of the deformable thin plate or film.

15. An optical system as claimed in claim 14, wherein the control system is arranged to use observations of the sensing means to operate in closed-loop manner to maintain desired behavior of the deformable thin plate or film.

16. An optical system as claimed in claim 14, wherein the sensing means comprises a photosensitive element.

17. An optical system as claimed in claim 10, wherein the sensing means comprises a plurality of sensors.

18. An optical system as claimed in claim 10, wherein the actuator means comprises one of a piezoelectric actuator and a pneumatic actuator.

19. An optical system as claimed in claim 10, wherein the motion is imparted to the thin plate or film one of by a mounting frame moved by the actuator means and by an air flow.

20. An optical system as claimed in claim 10, wherein the actuator means comprises a plurality of actuators.

21. An optical system as claimed in claim 14, wherein the sensing means comprises one of a piezoelectric, acoustic, electromagnetic, capacitive, current or voltage sensor.

22. An optical system comprising:
a coherent light source;
optical elements for directing light from the source to a target, said optical elements including at least one diffusing element arranged to reduce a coherence volume of light from the source and a deformable mirror system; and
a control system arranged to control the deformable mirror system to form different speckle patterns over time at the target with a temporal frequency greater than a temporal resolution of an illumination sensor or an eye of an observer to reduce speckle contrast ratio in the observed illumination,
wherein the deformable mirror system comprises:
a thin plate or film coated to reflect predetermined wavelengths of light; and
actuator means arranged to impart motion to the thin plate or film such that its surface shape is continuously deformed elastically.

\* \* \* \* \*